United States Patent
Wasniewski et al.

(10) Patent No.: US 10,591,180 B2
(45) Date of Patent: Mar. 17, 2020

(54) PREFABRICATED OUTDOOR THERMAL DUCT SYSTEM

(71) Applicants: James Wasniewski, Tinley Park, IL (US); Cory Wasniewski, Tinley Park, IL (US)

(72) Inventors: James Wasniewski, Tinley Park, IL (US); Cory Wasniewski, Tinley Park, IL (US)

(*) Notice: Subject to any disclaimer, the term of this patent is extended or adjusted under 35 U.S.C. 154(b) by 268 days.

(21) Appl. No.: 15/420,175

(22) Filed: Jan. 31, 2017

(65) Prior Publication Data

US 2018/0216844 A1 Aug. 2, 2018

(51) Int. Cl.
*F24F 13/02* (2006.01)
*F16L 9/00* (2006.01)

(52) U.S. Cl.
CPC .......... *F24F 13/0272* (2013.01); *F16L 9/003* (2013.01); *F24F 13/0209* (2013.01); *F24F 13/0263* (2013.01); *F24F 13/0281* (2013.01)

(58) Field of Classification Search
CPC ... F16L 9/003; F16L 25/0009; F24F 13/0272; F24F 13/0281; F24F 13/0209; F24F 13/0263
USPC .................................................. 285/47, 424
See application file for complete search history.

(56) References Cited

U.S. PATENT DOCUMENTS

| 4,609,214 A * | 9/1986 | Bonjour ......................... 285/47 |
| 2004/0202807 A1* | 10/2004 | Earnest ............... F24F 13/0263 |
| 2005/0156429 A1* | 7/2005 | Muckenschnabel ............ 285/47 |
| 2013/0174934 A1* | 7/2013 | Duffy .................. F24F 13/0209 |
| 2015/0204573 A1* | 7/2015 | Gray .................... F24F 13/0263 |

* cited by examiner

*Primary Examiner* — Zachary T Dragicevich
(74) *Attorney, Agent, or Firm* — Miller, Matthias & Hull LLP

(57) ABSTRACT

A prefabricated outdoor thermal duct system is provided having a metal formed ductwork air passage, a hard board insulation layer glued to the metal duct leaving custom cut space for duct connections, a custom prefabricated cladding formed and adhered to the hard board insulation, a custom fabricated insert matching the insulation material, installed over the duct connection in the field to seal the joint, and a final fabricated cap adhered to the cladding.

9 Claims, 6 Drawing Sheets

PREFABRICATED OUTDOOR THERMAL DUCT SYSTEM

FIELD

The present disclosure relates generally to HVAC ductwork and, more particularly, to a prefabricated outdoor thermal duct system.

BACKGROUND

It is traditionally time-consuming and expensive to construct an outdoor duct system in the field from basic materials. The installer must also be a fabricator in many senses, and the time spent outdoors in the elements is often excessive.

The present disclosure is directed to methods and system that may eliminate certain shortcomings, as noted above or otherwise. However, it should be appreciated that such a benefit is neither a limitation on the scope of the disclosed principles nor of the attached claims, except to the extent expressly noted in the claims. Additionally, the discussion of technology in this Background section is reflective of the inventors' own observations, considerations, and thoughts, and is in no way intended to accurately catalog or comprehensively summarize the art currently in the public domain. As such, the inventors expressly disclaim this section as admitted or assumed prior art. Moreover, any identification or implication above or otherwise herein of a desirable course of action reflects the inventors' own observations and ideas, and should not be assumed to indicate an art-recognized desirability.

SUMMARY

In accordance with one aspect of the present disclosure, a prefabricated outdoor thermal duct system is provided for easy installation. The system may include a metal formed ductwork air passage, a hard board insulation layer glued to the metal duct leaving custom cut space for duct connections and a custom prefabricated cladding formed and adhered to the hard board insulation. Further included are a custom fabricated insert matching the insulation material, installed over the duct connection in the field to seal the joint and a final fabricated cap adhered to the cladding.

The metal formed ductwork air passage may be Transverse Duct Connector (TDC), Transverse Duct Flange (TDF), Slip and Drive (S&D) or welded construction. Moreover, the metal formed ductwork air passage may be made of galvanized metal, aluminum, stainless steel or PVC-coated metal. The hard board insulation layer may include different types, thicknesses and R-values of hard board insulation and the custom prefabricated cladding may include custom formed ABS with UV protection of a selected thickness and color.

The custom prefabricated cladding may be attached via one of solvent welding, friction welding or thermal welding to form a weather-proof and permanent bond and the final fabricated cap may be attached to the cladding via one of solvent welding, friction welding or thermal welding. Any seams may be sealed with an adhesive sealant caulk.

By way of example, the completed assembly is installed on one of an HVAC system, a ventilation system and an exhaust system.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

It should be understood that the drawings are not necessarily to scale, and that the disclosed embodiments are illustrated diagrammatically, schematically, and in some cases in partial views. In certain instances, details which are not required or helpful for an understanding of the disclosed methods and apparatuses or which render other details difficult to perceive may have been omitted. It should be further understood that the following detailed description is merely exemplary and not intended to be limiting in its application or uses. As such, the present disclosure is for purposes of explanatory convenience only, and it will be appreciated that the disclosure may be implemented in numerous other ways, and within various systems and environments not shown or described herein.

DETAILED DESCRIPTION

In overview, the invention includes, in an embodiment, a prefabricated exterior cladded insulated ductwork and related fittings for HVAC, ventilation and exhaust systems. The base of the system is a metal formed ductwork or fitting with TDC, TDF, S & D, welded or similar connection for the air passage way of various metals and gauges. These may include galvanized metal, Aluminum, Stainless Steel, PVC coated metal or any other metal product.

Hard board insulation is then cut, fabricated and glued to the metal duct leaving custom cut space for duct connections. This layer may include different types, thicknesses and R-values of hard board insulation. A custom prefabricated cladding is then formed and adhered via custom shape and form to the hard board insulation. This layer may include, for example, custom formed ABS with UV protection of various thicknesses and colors. Alternatively, the system may utilize other cladding materials that can be fabricated and formed. The overlap cladding is solvent welded, friction welded or thermal welded to form a weather-proof and permanent bond.

A custom fabricated insert matching the insulation material is then installed over the duct connection in the field to seal the joint, and a final fabricated cap is adhered to the cladding. The final cap cladding is solvent welded, friction welded or thermal welded to form a weather proof bond, and seams are then sealed with an adhesive sealant caulk. Fabricated sections can be made in individual pieces or large prefabricated assemblies.

Figure 1:
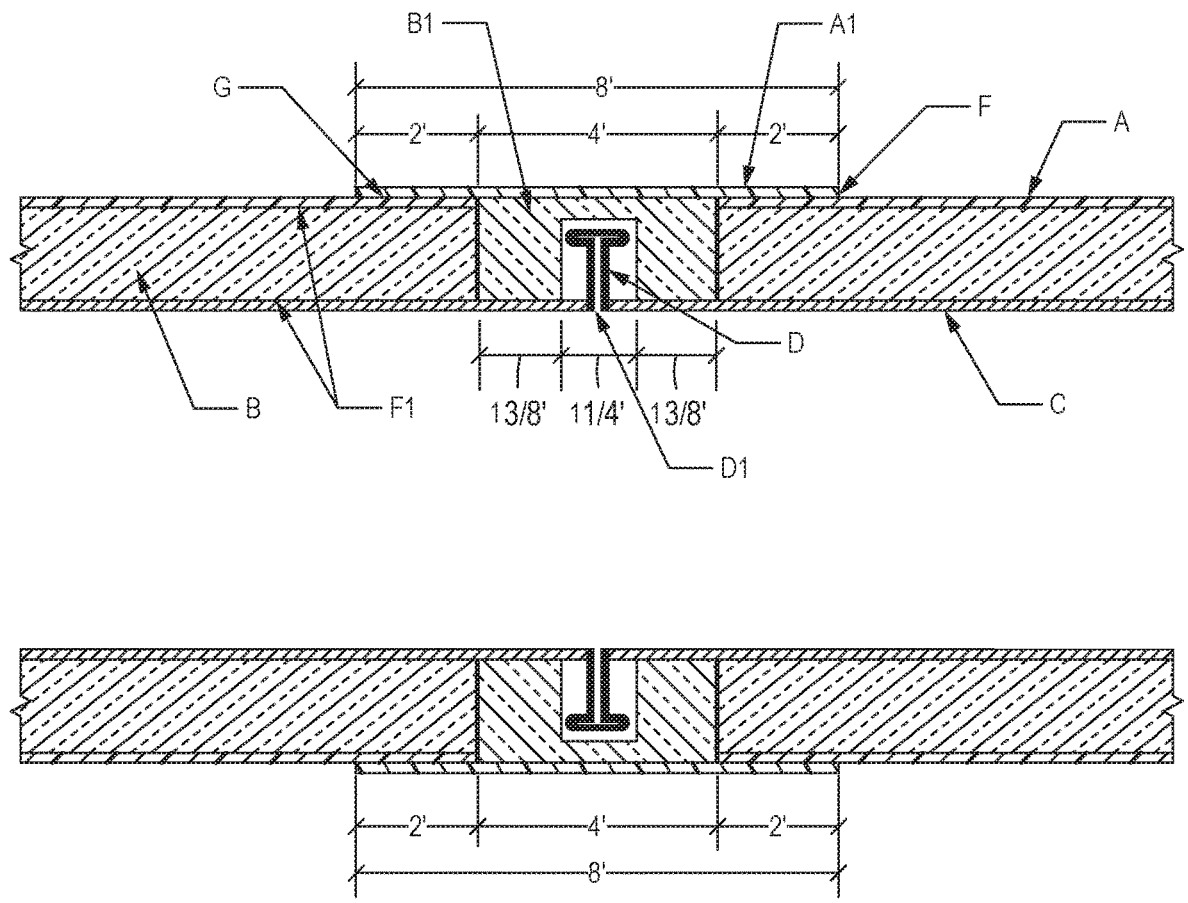
FIG. 1 shows an exterior cladded insulated ductwork field assembly detail in accordance with an embodiment of the described principles.

Turning to FIG. 1, an exterior cladded insulated ductwork field assembly detail is shown in cross-section, in accordance with an embodiment of the described principles. Referring to the letter reference marks, element A is an ABS coating such as 0.060 ABS or 0.030 ABS. Element B is duct board insulation such as 4" duct board insulation R-20, 3" duct board insulation R-15, 2.5" duct board insulation R-12.5 or 2" duct board insulation R-10. Referring to element C, this element is the metal ductwork and may be for example galvanized G-90 duct work, stainless steel duct work, aluminum duct work or PVC coated duct work.

The reference mark D refers to the TDC joint which may be a welded connection or an S-D connection. On a related note, mark D1 references TDC gasket material. The mark F denotes a sealant-caulk component and mark G is indicative of the solvent welded material. The reference A-1 denotes the field installed ABS cover, while B-1 shows the field inserted foam insulation and F-1 shows the sealant-glue.

Figure 2:
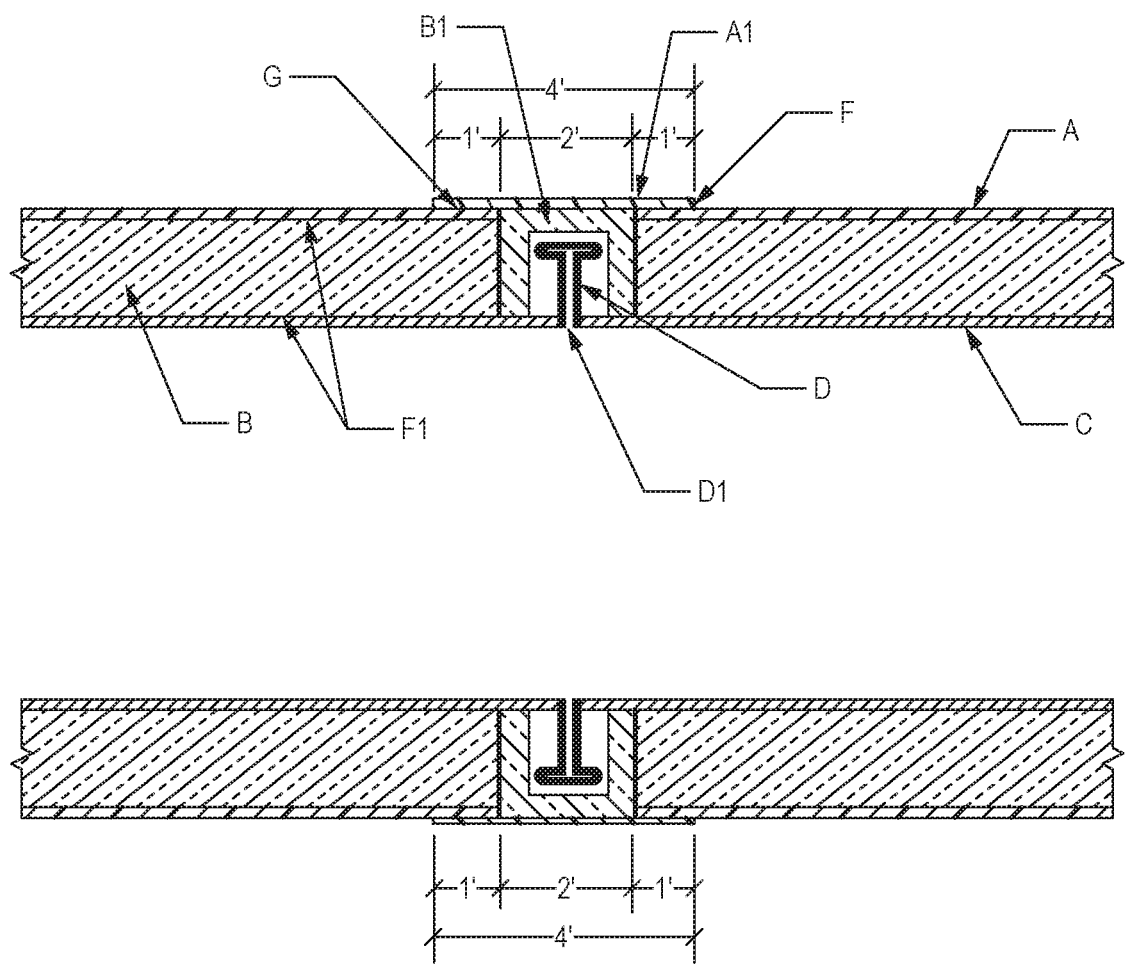
FIG. 2 shows another exterior cladded insulated ductwork field assembly detail in accordance with an embodiment of the described principles.

Turning to FIG. 2, another exterior cladded insulated ductwork field assembly detail is shown in cross-section, in accordance with an embodiment of the described principles. In this view, additional measurements of dimensions in keeping with an embodiment of the disclosed principles are shown.

Figure 3:
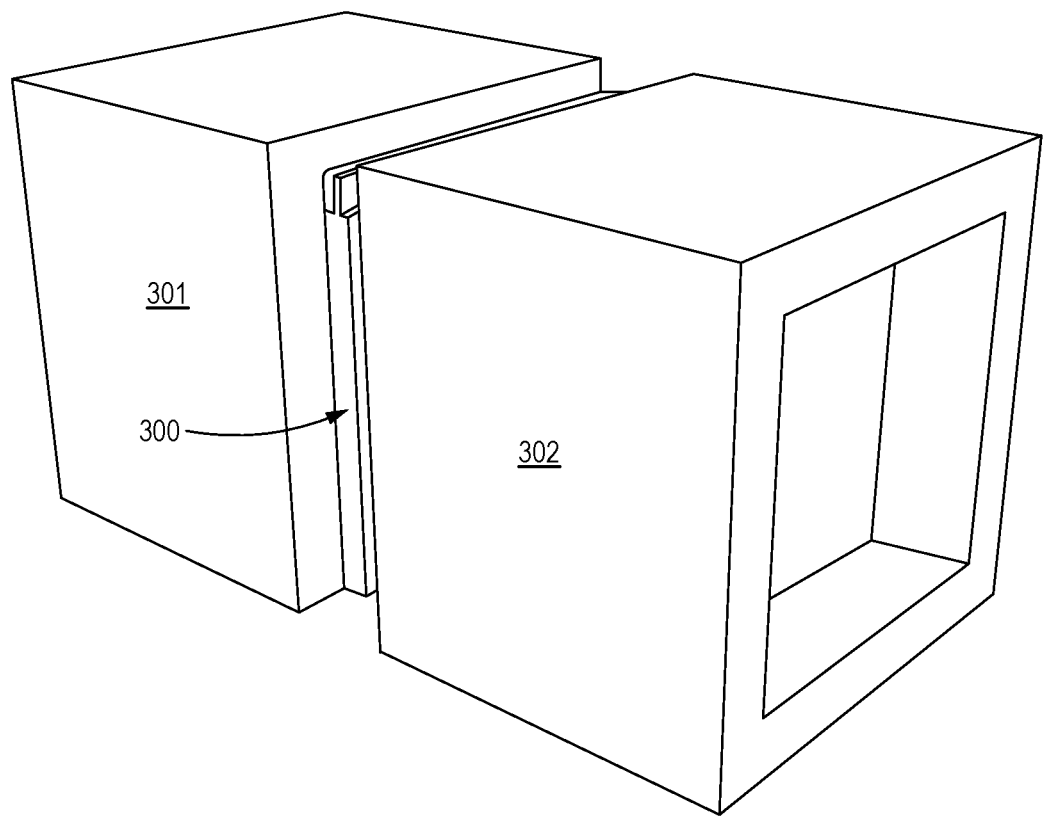
FIG. 3 shows an exterior cladded insulated ductwork shop assembly detail in accordance with an embodiment of the described principles.
Figure 4:
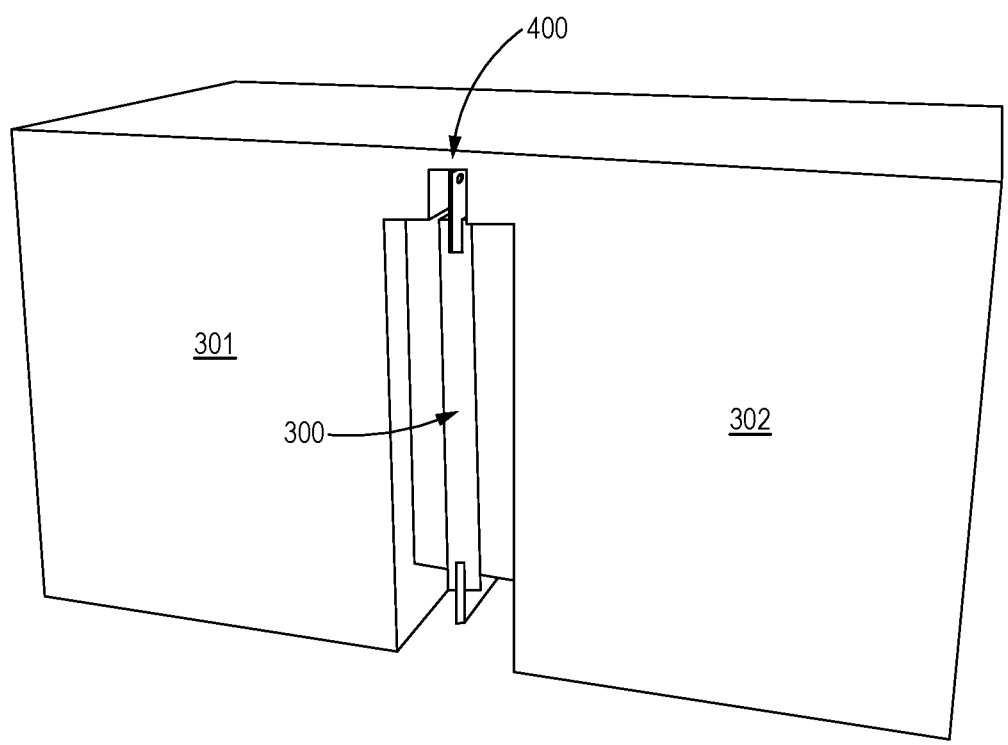
FIG. 4 shows another exterior cladded insulated ductwork shop assembly detail in accordance with an embodiment of the described principles.

Turning to FIG. 3, an exterior cladded insulated ductwork shop assembly detail is shown in accordance with an embodiment of the described principles. As can be seen, two prefabricated sections 301, 302 are joined at an exposed joint 300. Turning to FIG. 4, the exterior cladded insulated ductwork shop assembly detail of FIG. 3 is shown including a custom fabricated insert 400 matching the insulation material that has been installed over the duct connection to seal the joint.

Figure 5:
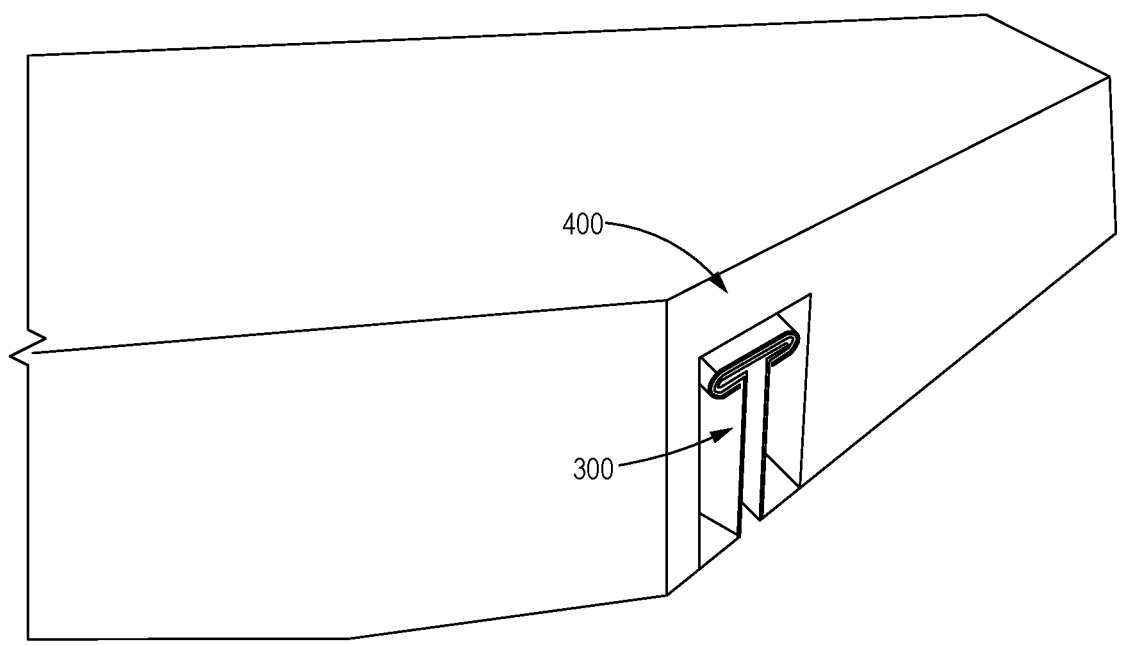
FIG. 5 shows another exterior cladded insulated ductwork shop assembly detail in accordance with an embodiment of the described principles.
Figure 6:
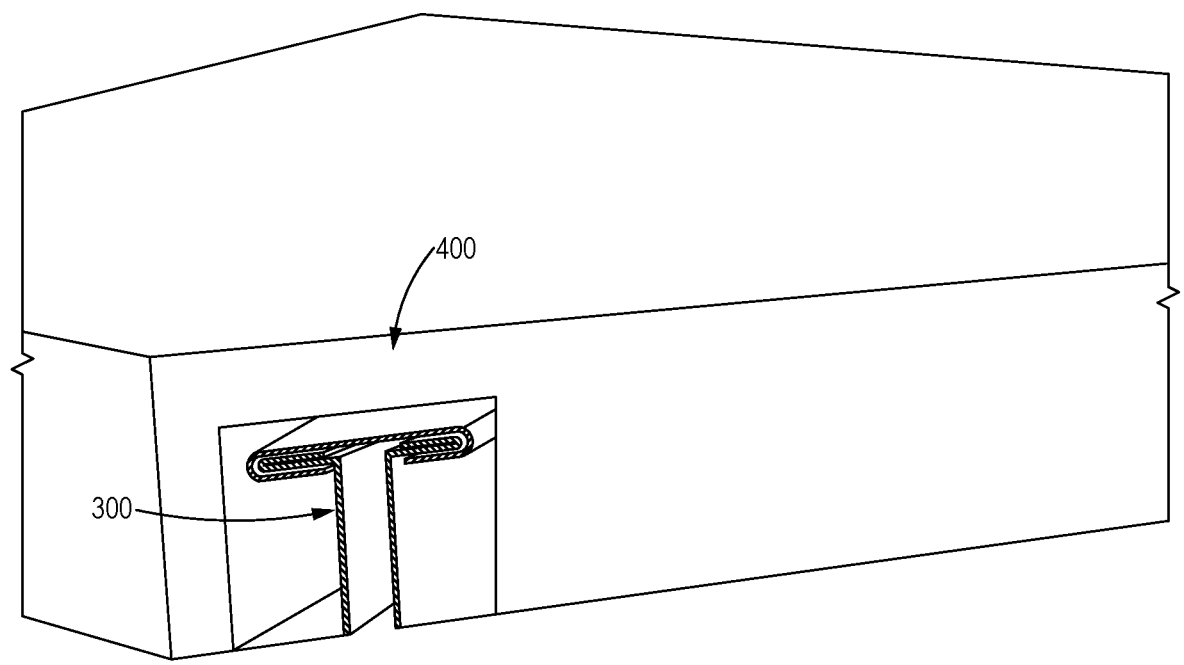
FIG. 6 shows another exterior cladded insulated ductwork shop assembly detail in accordance with an embodiment of the described principles.

Turning to FIG. 5, a detail view of the insulated joint is shown in accordance with an embodiment of the described principles. The joint 300 and custom fabricated insert 400 can be better seen in this view. Finally, a detail view of the joint from a different angle is shown in FIG. 6.

It will be appreciated that example systems and have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. An outdoor thermal duct system comprising:
    a metal formed ductwork air passage that includes a duct connection joint disposed in a first space;
    a layer comprised of a first hard board insulation, the layer adhered to the metal formed ductwork air passage, the layer defining the first space in which the duct connection joint is disposed;
    a cladding adhered to the layer;
    an insert comprised of the first hard board insulation, the insert disposed inside the first space and over the duct connection joint to seal the duct connection joint; and
    a cap adhered to the cladding, wherein a seam between the cap and the cladding is sealed with an adhesive sealant caulk.

2. The outdoor thermal duct system in accordance with claim 1, wherein the metal formed ductwork air passage is of a Transverse Duct Connector (TDC), Transverse Duct Flange (TDF), Slip and Drive (S&D) or welded type.

3. The outdoor thermal duct system in accordance with claim 1, wherein the metal formed ductwork air passage comprises galvanized metal, aluminum, stainless steel or PVC-coated metal.

4. The outdoor thermal duct system in accordance with claim 1, wherein the layer further including a second hardboard insulation having a different type, thickness or R-value than the first hard board insulation.

5. The outdoor thermal duct system in accordance with claim 1, wherein the cladding includes UV protection.

6. The outdoor thermal duct system in accordance with claim 5, wherein the cladding is adhered via solvent welding, friction welding or thermal welding to form a weatherproof and permanent bond.

7. The outdoor thermal duct system in accordance with claim 1, wherein the cap is adhered to the cladding via solvent welding, friction welding or thermal welding.

8. The outdoor thermal duct system in accordance with claim 1, wherein the outdoor thermal duct system is installed on an HVAC system, a ventilation system or an exhaust system.

9. The outdoor thermal duct system in accordance with claim 1, wherein the cap is disposed over the insert.

* * * * *